Patented Oct. 23, 1923.

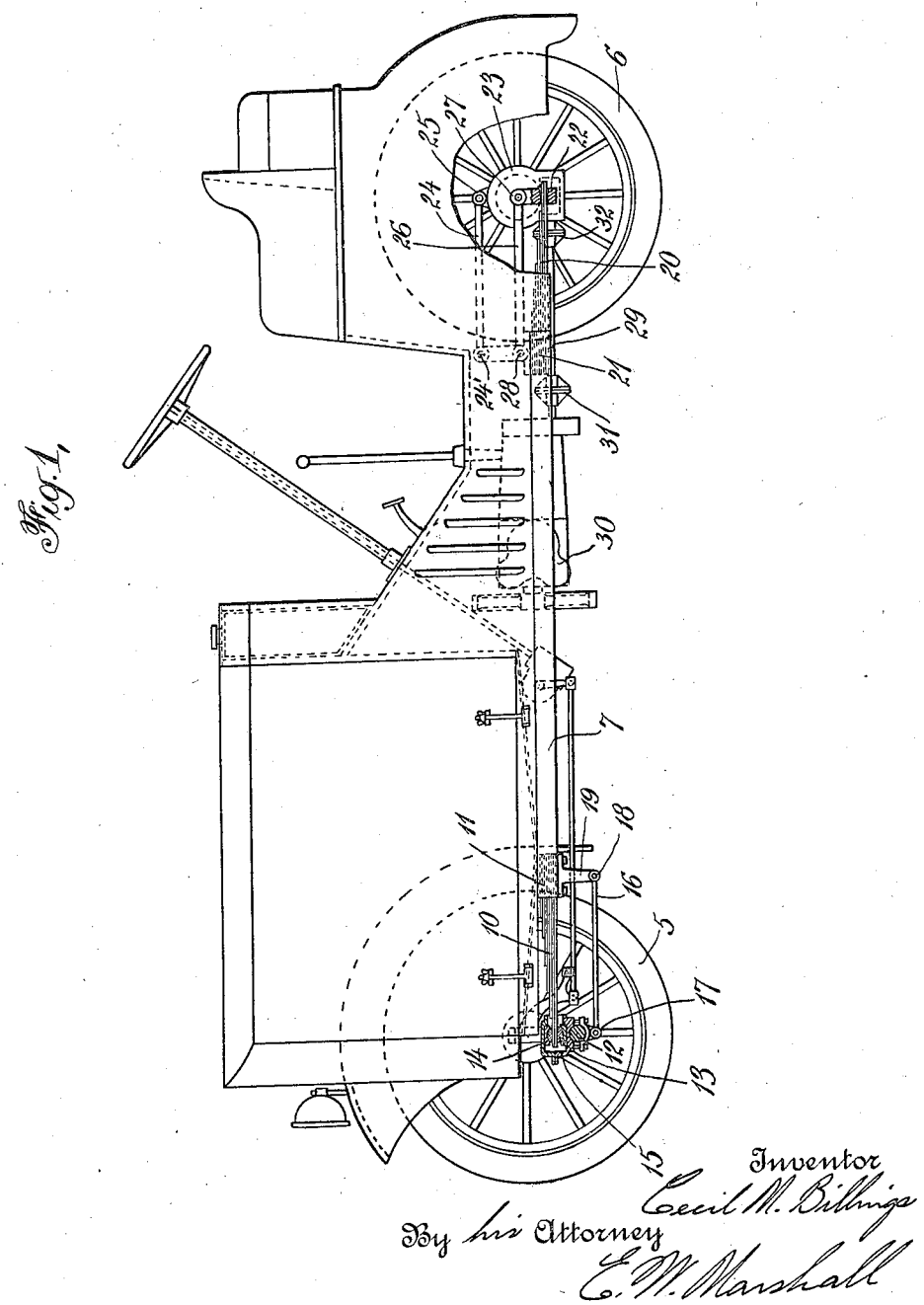

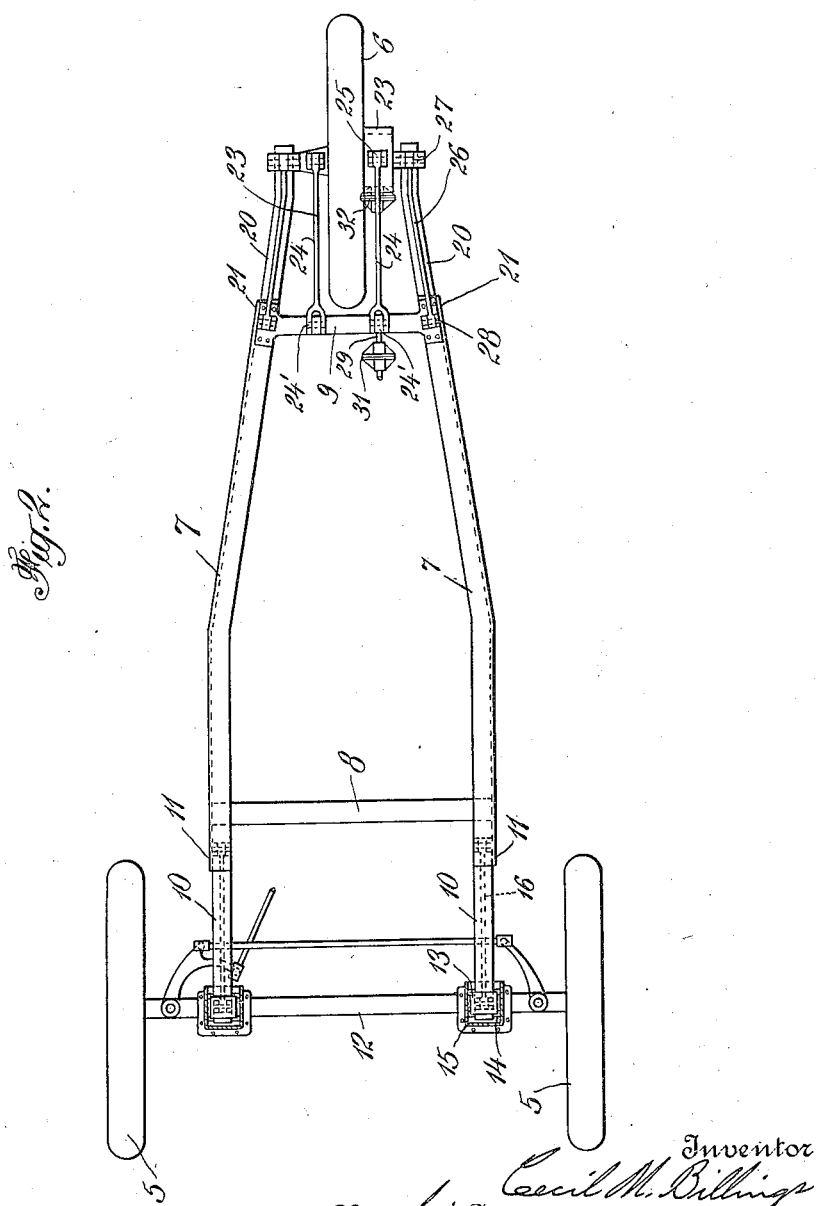

1,471,879

UNITED STATES PATENT OFFICE.

CECIL M. BILLINGS, OF BROOKLYN, NEW YORK, ASSIGNOR TO DELMORE MANUFACTURING CO., INC., OF NEW YORK, N. Y., A CORPORATION OF NEW YORK.

MOTOR VEHICLE.

Application filed October 2, 1919. Serial No. 327,997.

*To all whom it may concern:*

Be it known that I, CECIL M. BILLINGS, a citizen of the United States of America, and a resident of Brooklyn, county of Kings, and State of New York, have invented certain new and useful Improvements in Motor Vehicles, of which the following is a specification, reference being had to the accompanying drawings, forming a part thereof.

My invention relates particularly to the lighter class of motor vehicles used for instance for light delivery purposes.

The objects of the invention primarily are to improve and simplify the spring suspension.

Briefly the invention contemplates the mounting and supporting of the frame or body of the vehicle on leaf springs, having a sliding and pivotal connection with the axles.

Other features and details of construction will appear as the specification proceeds and will be understood from the accompanying drawings wherein I have illustrated the invention embodied in a practical commercial form.

In these drawings:

Figure 1 is a side elevation and part sectional view of the machine.

Figure 2 is a plan view of the chassis, with the motor and control gear omitted. The vehicle disclosed is of the three wheel type, embodying the two front steering wheels 5 and the rear drive wheel 6.

The frame consists of the two side sills 7 connected by suitable braces 8 and 9 and arranged on rearwardly convergent lines, as indicated in Figure 2.

At the front this frame is supported by the forwardly extending leaf springs 10 made fast to the forward ends of the sills at 11, said springs having a bearing at their forward ends on the front axle 12. These bearings consist in the present disclosures of balls or spherical elements 13, carried by the forward ends of the springs, said balls having a rocking engagement in the boxes 14, which are slidably engaged in the casings 15, secured on the axle. The movements of the axle relative to the frame are controlled by radius rods 16, pivoted to the axle at 17 at points in line with the balls 13 and pivoted at 18 to the brackets 19 secured to the side sills substantially in line with the rearward or fixed ends of the springs. It follows from this construction that the axle will have a free up and down movement dependent upon the flexibility of the spring connections between the axle and frame and controlled by the radius rod connections.

At the rear the side members of the frame are similarly provided with leaf springs 20 fixed to the rearward ends of the side sills at 21 and having a sliding engagement at their rearward ends in the bearings 22 carried by the rear axle which in the case disclosed takes the form of the gear housing 23.

Radius rods 24 pivoted at their forward ends at 24' on brackets in line with the fixed ends of the springs and pivoted at their rearward ends at 25 in line with the axis of the axle control the movements of the rearward axle. The movement of this axle is further controlled by an additional set of radius rods 26, pivoted at their rearward ends at 27 to the axle housing substantially in line with its axis and pivoted at their forward ends at 28 substantially in line with the fixed ends of the springs. This construction provides in effect a parallel link motion which permits the axle housing to rise and fall with respect to the frame while maintaining the gear casing or housing substantially upright.

This gear casing contains suitable gear mechanism which is driven by the propeller shaft 29, said shaft extending rearwardly from the motor 30. One or more universal joints, such as indicated at 31 and 32 may be interposed in this drive connection.

The construction disclosed provides a flexible and relatively free form of spring mounting for the body and at the same time the movements are properly controlled to prevent misalinement of the parts or derangement of the driving and steering gear.

What I claim is:

1. In a vehicle spring suspension, the combination with a vehicle frame and axle housing, of a pair of leaf springs secured to the frame and having each a sliding pivotal engagement with the axle housing and two pairs of pivoted radius rods extending from the frame to the axle housing with the rods of one pair disposed in substantial parallelism with the rods of the other pair.

2. In a vehicle spring suspension, the combination with a vehicle frame and axle housing, of a pair of leaf springs secured to the frame and having each a sliding pivotal engagement with the axle housing and two pairs of pivoted radius rods extending from the frame to the axle housing with the rods of one pair disposed in substantial parallelism with the rods of the other pair, one pair of said radius rods extending from substantially the points of connection of the springs with the frame and connected with the axle housing at substantially the axis thereof and the other pair of radius rods extending from a point substantially in line with the points of connection of the springs with the frame to points on the axle housing removed from the axis thereof.

3. In a vehicle spring suspension, the combination with a vehicle frame and the front and rear axles, of leaf springs projecting forwardly from the front ends of the frame and having each a sliding pivotal bearing in the front axle and leaf springs projecting rearwardly from the rear end of the frame and having each a sliding pivotal engagement with the rear axle and radius rods connected between the frame and forward and rear axles for controlling the relative movements of the axles and frame.

4. In a vehicle spring suspension, the combination with a vehicle frame and axle, of a box slidably mounted on the axle, a spherical bearing element engaged in said slidable box and a leaf spring secured to the frame and engaged with said spherical bearing element.

In witness whereof I hereunto set my hand this 27th day of September, 1919.

CECIL M. BILLINGS.